(12) United States Patent
Roussos

(10) Patent No.: US 10,994,163 B2
(45) Date of Patent: May 4, 2021

(54) KITCHEN VENTILATION SYSTEM

(71) Applicant: Andreas Roussos, Elora (CA)

(72) Inventor: Andreas Roussos, Elora (CA)

( * ) Notice: Subject to any disclaimer, the term of this patent is extended or adjusted under 35 U.S.C. 154(b) by 39 days.

(21) Appl. No.: 16/077,920

(22) PCT Filed: Feb. 15, 2016

(86) PCT No.: PCT/CA2016/050135
§ 371 (c)(1),
(2) Date: Aug. 14, 2018

(87) PCT Pub. No.: WO2017/139865
PCT Pub. Date: Aug. 24, 2017

(65) Prior Publication Data
US 2019/0030382 A1    Jan. 31, 2019

(51) Int. Cl.
*A62C 3/00* (2006.01)
*F24F 13/28* (2006.01)
*F24C 15/20* (2006.01)
*A62C 4/00* (2006.01)
*A62C 4/04* (2006.01)
*B01D 45/08* (2006.01)

(52) U.S. Cl.
CPC ............ *A62C 3/006* (2013.01); *A62C 4/00* (2013.01); *A62C 4/04* (2013.01); *F24C 15/2035* (2013.01); *F24F 13/28* (2013.01); *B01D 45/08* (2013.01)

(58) Field of Classification Search
CPC .. A62C 3/006; A62C 4/00; A62C 4/04; F24C 15/2035; F24F 13/28; B01D 45/08
See application file for complete search history.

(56) References Cited

U.S. PATENT DOCUMENTS 1,641,102 A * 8/1927 Slocum .................. F23J 15/022
                                                              55/309
3,865,193 A * 2/1975 Hall ......................... F24F 3/16
                                                                169/65
(Continued)

*Primary Examiner* — David J Laux
(74) *Attorney, Agent, or Firm* — Kyle R. Satterthwaite; Michael R Williams; Ade & Company Inc.

(57) ABSTRACT

Described herein is a kitchen ventilation system, comprising: a kitchen hood communicative with a kitchen exhaust duct; a fan communicative with the hood to create an air flow through the hood and to the exhaust duct; a fire barrier air filter mounted to the hood to receive and filter the air flow, the fire barrier air filter comprising a plurality of elongate extruded bodies in parallel alignment; each extruded body bound by first and second opposing concave surfaces and first and second baffle surfaces, the first and second baffle surfaces oriented transverse to the air flow; and at least one of the of the first and second concave surfaces oriented in facing opposition to a neighboring concave surface provided by a neighboring extruded body to form a cooperating pair of facing concave surfaces, the pair of facing concave surfaces defining a narrow longitudinal inlet gap, a narrow longitudinal outlet gap, and a longitudinal tubular chamber communicating therebetween. A kit providing at least a fire barrier air filter of the system and instructions for its installation is also described. A method of fire prevention using components of the system or kit is also described.

18 Claims, 3 Drawing Sheets

(56) References Cited

U.S. PATENT DOCUMENTS

| | | | | |
|---|---|---|---|---|
| 4,189,990 | A * | 2/1980 | Kittler | F24C 15/20 |
| | | | | 454/251 |
| 5,318,609 | A * | 6/1994 | Kittler | B01D 45/08 |
| | | | | 55/443 |
| 5,904,751 | A * | 5/1999 | Van Niekerk | B01D 46/30 |
| | | | | 55/385.1 |
| 5,935,300 | A * | 8/1999 | Niekerk | B01D 45/08 |
| | | | | 55/385.1 |
| 6,162,286 | A * | 12/2000 | Hasama | B01D 46/0082 |
| | | | | 95/281 |
| 7,422,613 | B2 * | 9/2008 | Bockle | B01D 45/16 |
| | | | | 55/318 |
| 9,222,681 | B2 * | 12/2015 | Nijenhuis | A62C 3/006 |

* cited by examiner

KITCHEN VENTILATION SYSTEM

BACKGROUND OF THE INVENTION

Field of the Invention

The present invention relates to air filtration, and more particularly to filtration of kitchen airborne contaminants.

Description of the Related Art

All kitchen hoods are equipped with a filter of some sort. The filter is positioned at the point of exit where the canopy and chimney exhaust apparatus meet. In many cases the filters are a passing thought as very little emphasis is given to collecting the grease before it enters the chimney exhaust system.

With the exception of water wash techniques, grease is typically allowed to pass through. The result is that the escaping grease coats the interior walls of the chimney exhaust ducts, the motor and all the way to the point of exit that being a wall or a roof.

Ultra Violet (UV) systems are used for odour abatement where required by local authorities and landlords or both. The intention is to attack the vapours as they exit. The result of exposing the UV lights to the escaping grease they get completely coated and render ineffective when it occurs. Therefore they require extremely high maintenance and are costly.

Current kitchen ventilation systems are unable to prevent kitchen fires from entering a kitchen exhaust duct. Current systems are operating on the principle of containing the kitchen fires before the flames enter the chimney exhaust ducts. The exhaust ducts, depending on when the last preventative maintenance occurred, may be heavily coated with grease and if so can quickly carry the fire to the point of exit in some cases. Occurrences of a kitchen fire entering an exhaust duct and causing evacuation of a commercial building are well documented.

Accordingly, there is a continuing need for alternative kitchen ventilation systems.

SUMMARY OF THE INVENTION

In an aspect there is provided, a kitchen ventilation system, comprising:

a kitchen hood communicative with a kitchen exhaust duct;

a fan communicative with the hood to create an air flow through the hood and to the exhaust duct;

a fire barrier air filter mounted to the hood to receive and filter the air flow, the fire barrier air filter comprising a plurality of elongate extruded bodies in parallel alignment;

each extruded body bound by first and second opposing concave surfaces and first and second baffle surfaces, the first and second baffle surfaces oriented transverse to the air flow; and at least one of the of the first and second concave surfaces oriented in facing opposition to a neighboring concave surface provided by a neighboring extruded body to form a cooperating pair of facing concave surfaces, the pair of facing concave surfaces defining a narrow longitudinal inlet gap, a narrow longitudinal outlet gap, and a longitudinal tubular chamber communicating therebetween.

In another aspect there is provided, a method of preventing a kitchen fire from entering a kitchen exhaust duct, the method comprising:

installing a fire barrier air filter in a kitchen hood communicative with the kitchen exhaust duct, the fire barrier air filter comprising a plurality of pairs of facing elongate concave surfaces defining a narrow longitudinal inlet gap, a narrow longitudinal outlet gap, and a longitudinal tubular chamber communicating therebetween.

In yet another aspect there is provided, a kitchen fire prevention kit comprising:

a fire barrier air filter comprising a plurality of pairs of facing elongate concave surfaces defining a narrow longitudinal inlet gap, a narrow longitudinal outlet gap, and a longitudinal tubular chamber communicating therebetween; and instructions for installing the fire barrier air filter in a kitchen hood communicative with a kitchen exhaust duct.

DETAILED DESCRIPTION OF PREFERRED EMBODIMENTS

Figure 1:
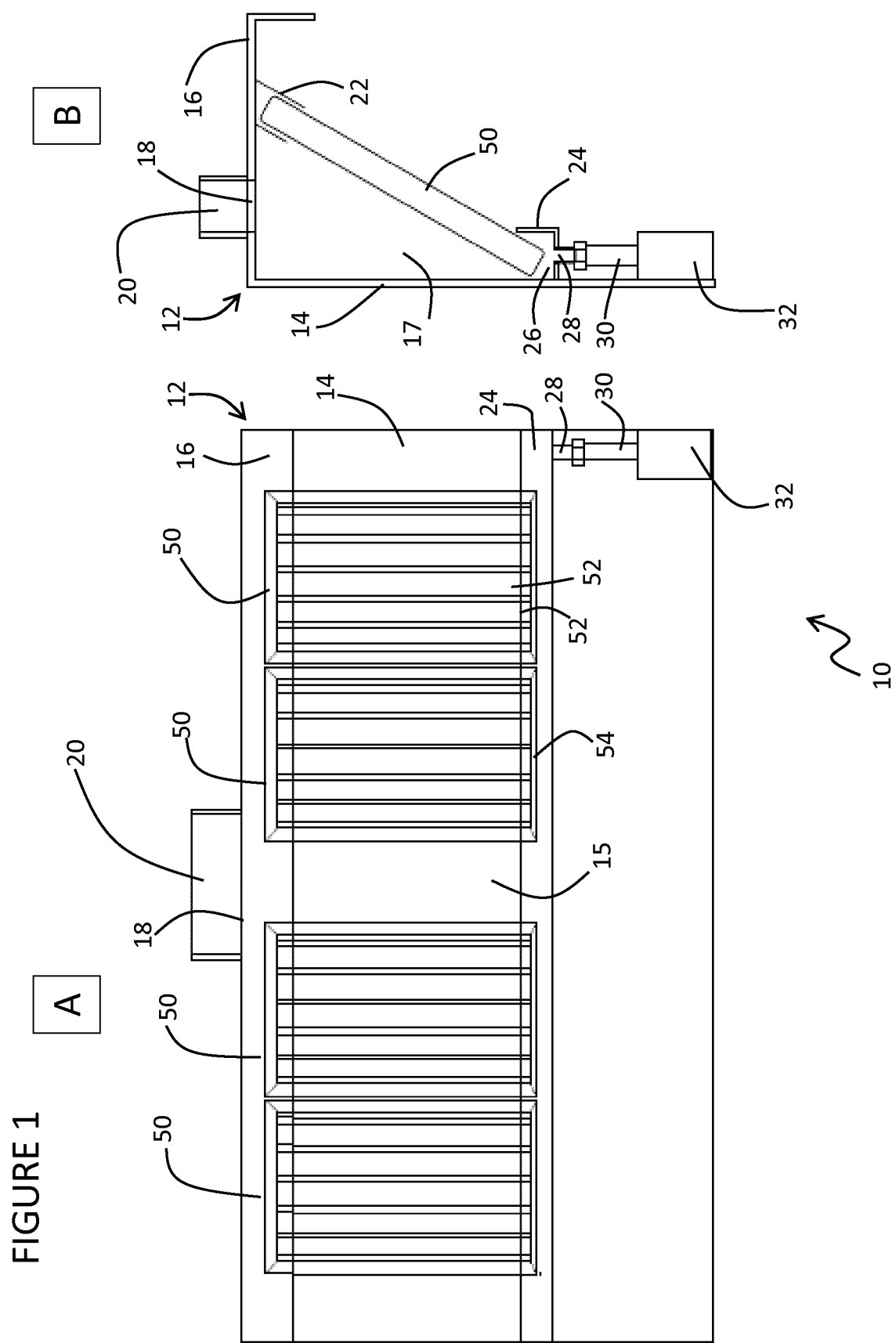
FIG. 1 shows an embodiment of a kitchen ventilation system in (A) a front plan view and (B) a side plan view.

Now referring to the drawings, a kitchen ventilation system 10 is described. Directional terms such as front, back, top, bottom, lower, upper, vertical, and horizontal may be used to describe the kitchen ventilation system or a fire barrier air filter included therein, and such terms are meant to be interpreted in the context of the kitchen ventilation system in operation in a kitchen where horizontal is a plane or direction substantially parallel to the base surface or floor of the kitchen.

FIG. 1A shows a front plan view of the kitchen ventilation system 10, while FIG. 1B shows a corresponding side plan view. The kitchen ventilation system 10 comprises a hood 12 formed of a housing providing a back wall 14, a front wall 15, and a canopy 16. The back wall 14 and the canopy 16 connect to form approximately a 90 degree interior angle and the front wall 15 is connected at an acute interior angle to both the back wall 14 and the canopy 16. The back wall 14, the front wall 15 and the canopy 16 are co-extensive defining a longitudinal interior chamber 17 having a lateral cross-section that is a right angle triangle with the front wall 15 providing the hypotenuse. An air outlet 18 formed integrally with the canopy 16 communicates with the interior chamber 17. The air outlet 18 connects the hood 12 to exhaust duct 20 which in turn connects with an exhaust fan or blower (not shown). The front wall 15 supports a plurality of air filters 50 mounted to form a majority of the surface area of the front wall 15. Each air filter 50 is mounted to a top bracket 22 and a bottom bracket 24. Bottom bracket 24 co-acts with collection tray 26. Collection tray 26 forms an elongate channel of sufficient length to span the plurality of air filters 50 collecting liquid or particulate run-off from the plurality of air filters 50. A drain tube 28 extends from a bottom surface and connects to heat resistant hose 30 which connects to an opening in a top surface of reservoir 32. Drain tube 28 remains in constant open communication with collection tray 26 and heat resistant hose 30, and heat resistant hose 30 in turn remains in constant open communication with reservoir 32. Collection tray 26 may be sloped downward in the direction of drain tube 28 so that liquid run-off from each air filter 50 accumulated on collection tray 26 flows towards drain tube 28 and downward through heat resistant hose 30 into reservoir 32.

The kitchen ventilation system 10 may be installed at or near any cooking apparatus, such as a fryer, a hot plate, a range, a grill and the like, that is expected to produce air borne volatile compounds and particulates when in use. Particulates can include grease and oil and other condensable contaminants carried in hot air fumes rising from a cooking apparatus that is in use. The kitchen ventilation system 10, intakes the hot air fumes in a transverse direction to the air filter 50 and outlets filtered air removed of grease and oil particles.

The air filter 50 comprises a plurality of extrusion bodies 52 aligned vertically and laterally offset or staggered in an alternating pattern providing pairs of concave surfaces in facing opposition to each other, each pair of facing concave surfaces defining a longitudinal inlet communicating with a longitudinal tubular chamber which in turn communicates with a longitudinal outlet. The longitudinal inlet and longitudinal outlet are uniformly narrow along their length, typically four to six times narrower than the diameter of the longitudinal tubular chamber. The plurality of extrusion bodies 52 are mounted in rectangular/square frame 54 including top and bottom U-shaped channel pieces that fix the extrusion bodies in parallel alignment and provide surfaces for coupling to top bracket 22 and bottom bracket 24, respectively. Bottom and/or top surfaces of the frame 54 are perforated defining holes communicating with the U-shaped channel for drainage of condensates, such as grease or oil, rolling down from the plurality of extrusion bodies 52. Air filters of this type have been previously described, for example in U.S. Pat. No. 5,318,609 (by Kittler published 7 Jun. 1994) and U.S. Pat. No. 8,216,331 (by Muller and Rentschler published 10 Jul. 2012), both of which are incorporated by reference.

Figure 2:
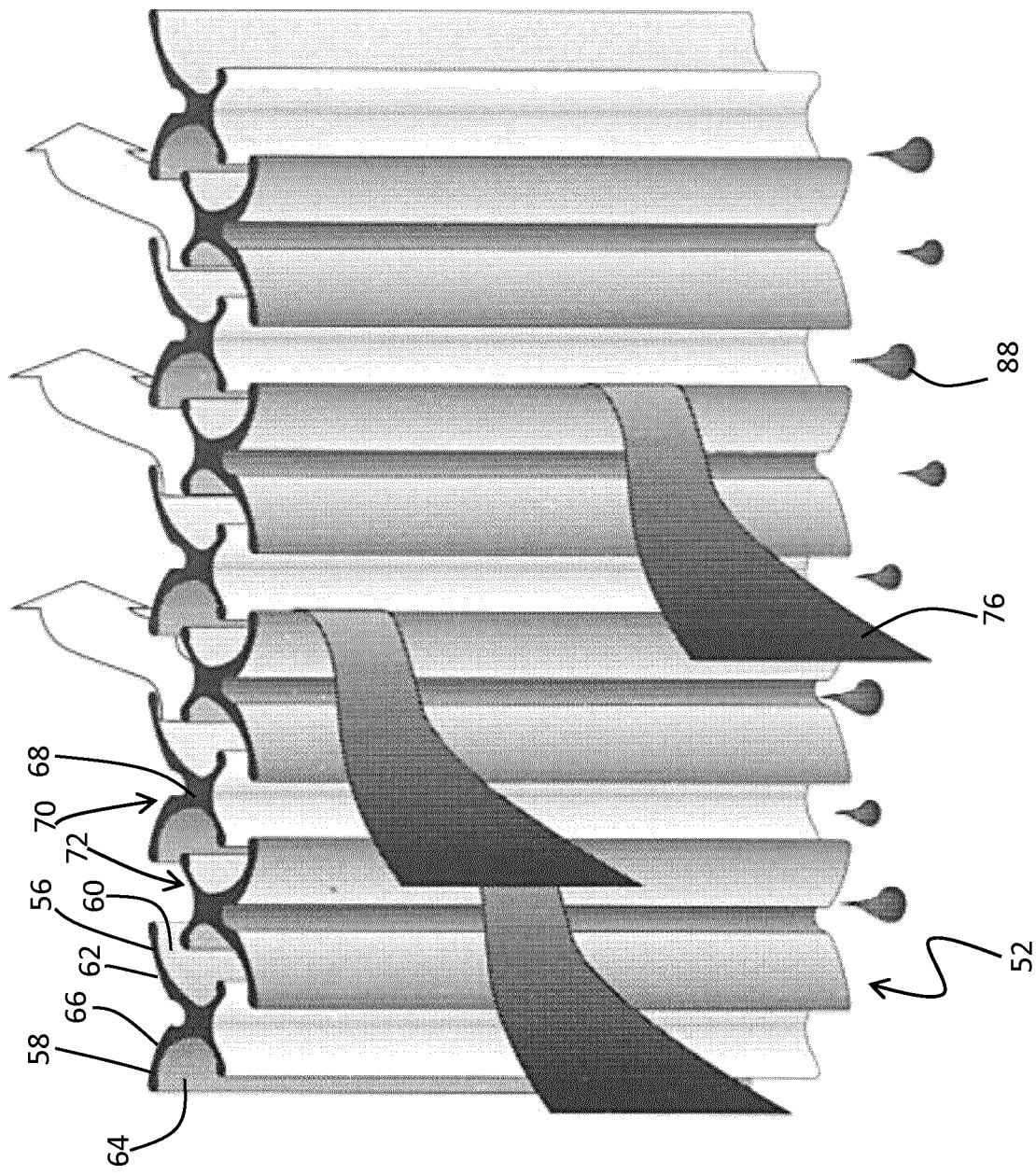
FIG. 2 shows a front perspective schematic view of a portion of a filter used in the kitchen ventilation system shown in FIG. 1.
Figure 3:
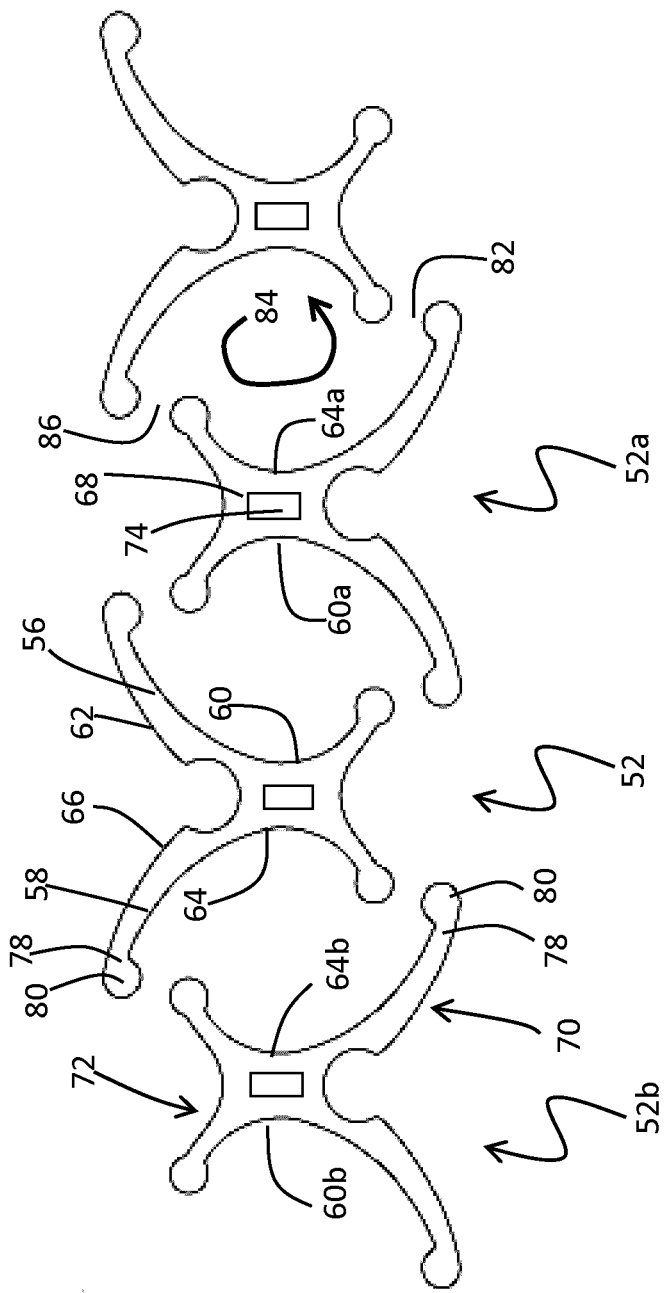
FIG. 3 shows a cross-sectional view of a portion of a filter used in the kitchen ventilation system shown in FIG. 1.

FIG. 2 shows a front perspective schematic view and FIG. 3 shows a horizontal cross-section view, both illustrating juxtaposition of a plurality of extrusion bodies 52 in parallel vertical alignment.

Each extrusion body 52 is elongate and forms opposing first and second curved plates 56 and 58, each curved plate is bound by a concave surface and a convex surface, and opposing lateral curved ends and opposing longitudinal edges. The first curved plate 56 provides a first concave surface 60 and a first convex surface 62, and the second curved plate 58 provides a second concave surface 64 and a second convex surface 66. The first and second curved plates are attached to central block 68 in mirror symmetry. The first concave surface 60 and the second concave surface 64 are directed away from each other, while the first convex surface 62 and the second convex surface 66 are in facing opposition. The first and curved plates, 56 and 58, are attached to the central block 68 at a corresponding mirror-symmetrical eccentric point of the first and second convex surfaces. 62 and 66, respectively.

The central block 68 is longitudinally co-extensive with first and second curved plates, 56 and 58. The first and second convex surfaces, 62 and 66, co-act with central block 68 to form first and second baffle surfaces, 70 and 72. A lateral cross-section of each extrusion body is X-shaped with the intersecting node of the X being off-center or eccentric. Accordingly, the lateral cross-section of the first and second baffles surfaces are V-shaped with the V-shaped cross-section of the first baffle surface 70 being greater than the V-shaped cross-section of the second baffle surface 70.

A bore 74 may be formed longitudinally and centrally throughout central block 68. The bore 74 may be used to fasten each extrusion body 52 to frame 54. The bore 74 is not necessary if other techniques of fixing extrusion bodies 52 to frame 54 are used. For example, first and second spacer bars (not shown), each defining a plurality of cutouts, each cutout shaped to mate with at least a part of a lateral cross-section of each extrusion body 52, the plurality of cutouts spaced in accordance with a desired alignment of the plurality of extrusion bodies 52. The first and second spacer bars are friction fit to first and second longitudinal ends, respectively, of the plurality of extrusion bodies 52. The first and second spacer bars and the first and second longitudinal ends of the plurality of extrusion bodies 52 can be capture within a U-shaped channel of frame 54.

Each extrusion body 52 provides multiple functional surfaces for removing particulates such as grease and oils from air flowing transverse to air filter 50 including first and second concave surfaces, 60 and 64, and first and second baffle surfaces, 70 and 72. The first and second baffle surfaces 70 and 72 are oriented to be transverse to direction 76 of air flow intake and provide V-shaped cross-section channels to receive air flow and condense air contaminants. The first and second concave surfaces, 60 and 64, are oriented substantially parallel to direction 76 of air flow intake and are placed in facing opposition to corresponding first and second concave surfaces, 60 and 64, provided by adjacent parallel extrusion bodies 52.

The plurality of extrusion bodies 52 are aligned so that the longitudinal axis of all of the plurality of extrusion bodies 52 are substantially parallel, but are not all co-planar. Each extrusion body 52 is 180 degrees rotated and laterally offset from its neighboring extrusion body 52a. Due to alternating rotation of extrusion bodies by 180 degrees, the first concave surface 60 of an extrusion body 52 is placed in facing opposition with a corresponding first concave surface 60a of a first neighboring extrusion body 52a. Similarly, the second concave surface 64 of an extrusion body 52 is placed in facing opposition with a corresponding second concave surface 64b of a second neighboring extrusion body 52b. The second concave surface 64a of the first neighboring extrusion body 52a continues and the first concave surface 60b of the second neighboring extrusion body 52b repeat the alignment of laterally off-set facing opposition to corresponding second and first concave surfaces, respectively, of further neighboring extrusion bodies. Due to the lateral off-set of adjacent extrusion bodies, corresponding concave surfaces can be juxtaposed in overlapping profiles to overlap a longitudinal edge 78 of a concave surface with a corresponding longitudinal edge of a corresponding concave surface preventing direct air flow from ingress to egress in between corresponding concave surfaces. Further perturbation of direct air flow may be achieved by bulged projection 80 extending from longitudinal edge 78. The bulged projection 80 is co-extensive with the longitudinal edge 78.

Each pair of corresponding facing concave surfaces defines a longitudinal inlet 82 communicating with a longitudinal tubular chamber 84 which in turn communicates with a longitudinal outlet 86. The longitudinal inlet 82 and longitudinal outlet 86 are substantially uniformly narrow along each of their entire length, typically four to six times narrower than the diameter of the longitudinal tubular chamber. The lateral cross-section of the longitudinal tubular chamber 84 is circular shaped. The longitudinal tubular chamber 84 provides a torsion air path between inlet 82 and outlet 86 allowing air contaminants to condense on the corresponding concave surfaces and drop as liquids 88 due to gravitational pull. Without wishing to be bound by theory, airborne contaminants may be removed from air flow due to cyclonic separation. The orientation of the air filter 50 and the extrusion bodies 52 will have a sufficiently vertical component to allow condensates of airborne liquid contaminants to drain due to gravity.

The kitchen ventilation system 10 can easily achieve separation efficiencies of 95% or higher for particle sizes of 0.3 microns or greater on a total mass basis. This is significant since it is the mass of particles that saturate or clog conventional filter systems, accumulate liquid in ducts and on rooftops, and contaminate the environment. Environmental agencies and Health & Safety agencies worldwide use the mass concentration of liquid and solid contaminants in the air as a means to regulate the amount of contaminant and pollutant expelled into the indoor or outdoor environments. Any of the smaller sub-micron particles in the gas stream left after passing through the air filter 50 can easily be handled by further filters for dry particulate, if so required. In the vast majority of cases, the mass concentration of such particulate left after air filter 50 is well below the regulated levels and the levels required for most applications. The kitchen ventilation system 10 may further incorporate any suitable additional filter such as disposable, pleated, bag, cartridge, HEPA filters or reusable wash panel filters providing economical high-efficiency performance. These filters are located downstream or after the air filter 50 ensuring that these additional filters have maximum operating life.

The system's ability to collect and sequester such a high amount of airborne particulate mist ensures a trouble free, eco-friendly, lower preventative maintenance approach.

One of the unexpected advantages that arise from the combination of the system process elements is a fire prevention function. The system 10 provides a fire barrier that prevents fires from entering the exhaust systems, thereby minimizing if not eliminating the risk of fires spreading through the chimney exhaust system to the outdoors and or adjoining properties when the air filters 50 are maintained properly.

Several tests have been conducted to demonstrate the fire barrier function of air filter 50.

In a first flame test, filters were saturated with corn oil and drained and a pan placed on a broiler underneath the hood burned 0.6 L of corn oil until the oil was consumed. Results were that there was no evidence of fire within the system and no evidence of flame or grease leakage from the system.

In a second flame test, the first flame test method was repeated except the broiler and pan were replaced with a burning crib (100 mm square single layer crib). Results were that there was no evidence of fire within the system and no evidence of flame or grease leakage from the system.

In a third flame test, the air filter resisted flames for three minutes without any deformation. The flames did not extend beyond the filter, far surpassing applicable standards that allow flames to penetrate as far as 18 inches beyond the filter. Additionally, the filter did not allow passage of sparks or burning embers into the air downstream.

The flame tests were carried out according to Underwriters' Laboratories of Canada inc. (UL-ULC) certification protocols based on the National Fire Prevention Association (http://www.nfpa.org/) standards. Under the set standards and testing conditions set out by NFPA and UL-ULC, flames are allowed to pass through fire baffles and enter a kitchen exhaust duct up to 18 inches. The reason this is the allowable distance is that based on the NFPA standards in case of kitchen fire emergencies a CO2 fire suppression system is supposed to be deployed.

As found in the third flame test under UL1046/ULC-S649 protocol testing neither flames nor other residuals pass through the tested filter.

Illustrative embodiments of the kitchen ventilation system 10 have been described above without any intended loss of generality. Further examples of modifications and variation are now provided. Still further variants, modifications and combinations thereof are contemplated and will be apparent to the person of skill in the art.

Components of the kitchen ventilation system include a kitchen hood communicative with a kitchen exhaust duct, a fan communicative with the hood to create an air flow through the hood and to the exhaust duct, and a fire barrier air filter mounted to the hood to receive and filter the air flow, the fire barrier air filter comprising a plurality of elongate extrusion bodies in parallel alignment.

Without wishing to be bound by theory, the fire barrier air filter defines a torsional air flow path to reduce temperature of air passing therethrough and prevent passage of flames and other heated residuals. The plurality of elongate extrusion bodies may be sized and shaped to a specific application, while maintaining that each extrusion body is bound by first and second opposing concave surfaces and first and second baffle surfaces, the first and second baffle surfaces oriented transverse to the air flow. The first and second baffle surfaces may be symmetrical or asymmetrical. Similarly, the first and second concave surfaces may be symmetrical or asymmetrical within each of their respective concave surfaces—that is, for an asymmetrical concave surface the rate of curvature from the first longitudinal edge to the center need not be symmetrical compared to the rate of curvature from the second longitudinal edge to the center. Additionally, the first and second concave surfaces may accommodate asymmetry to each other across a center line of symmetry of each extruded body. Typically, the first and second concave surfaces will be in mirrored symmetry to each other. The first and second concave surfaces will always be formed to be directed away from each other and away from the center line of symmetry of each extruded body such that the corresponding longitudinal center lines of the first and second concave surfaces will be separated by a shorter distance than the corresponding longitudinal edges of the first and second concave surfaces.

Typically both, but certainly at least one of the of the first and second concave surfaces is oriented in facing opposition to a neighboring concave surface provided by a neighboring extrusion body to form a cooperating pair of facing concave surfaces, the pair of facing concave surfaces defining a narrow longitudinal inlet gap, a narrow longitudinal outlet gap, and a longitudinal tubular chamber communicating therebetween. The longitudinal tubular chamber typically has a lateral cross-section of circular shape. The diameter of the longitudinal tubular chamber may be 4 to 6 times greater than a width of the longitudinal inlet gap or outlet gap.

Neighboring extrusion bodies may be aligned in lateral offset so that the cooperating pair of facing concave surfaces are laterally offset from each other. When a lateral offset is used, the lateral offset is typically less than half the width of the concave surfaces. Neighboring extrusion bodies may be rotated by 180 degrees compared to each other, so that a plurality of parallel aligned extrusion bodies follow an alternating sequence of 180 degree rotation.

Eliminating or minimizing a direct line of sight from the inlet gap to the outlet gap, the cooperating pair of facing concave surfaces may be positioned to overlap so that a longitudinal edge region of one of the cooperating pair of facing concave surfaces overlaps with a longitudinal edge region of the other of the cooperating pair of facing concave surfaces. Avoiding a direct line of sight from inlet gap to outlet gap enhances the fire barrier function of the air filter. The fire barrier function may also be enhanced with a bulged projection extending from at least one longitudinal edge of each of the pair of facing concave surfaces. A bulged projection may extend from all four longitudinal edges of the pair of facing concave surfaces. The bulged projection may be discontinuous, but is typically uniform and coextensive with the longitudinal edge. The bulged projection may be of any suitable shape, for example a lateral cross-section of circular shape has been shown to achieve acceptable results in flame tests.

The plurality of elongate extrusion bodies may be constructed from any suitable metal material, including metal alloys. For example, the elongate extrusion bodies may be made made of aluminum or anodized aluminum.

The plurality of extrusion bodies may be fixed and framed with any suitable structure. For example, the frame may provide a U-shaped channel to receive longitudinal ends of a plurality of extrusion bodies and optionally a spacer bar coupled to the ends for fixed alignment of the extrusion bodies. In certain examples, the frame providing a U-shaped channel and the spacer bar for fixing the plurality of extrusion bodies in alignment are made of galvanized steel or stainless steel. In certain examples, the frame is bent from a continuous U-shaped channel and attached at a single point so that the outer surface of the frame is an integral surface except for the singular attachment point.

The system can be installed de novo or incorporated within existing installations, for example a retrofit within a water-wash installation.

One or more components of the system can be incorporated within a method of use for preventing a kitchen fire from entering a kitchen exhaust duct. The method comprises installation of a fire barrier air filter in a kitchen hood communicative with the kitchen exhaust duct, the fire barrier air filter comprising a plurality of pairs of facing elongate concave surfaces defining a narrow longitudinal inlet gap, a narrow longitudinal outlet gap, and a longitudinal tubular chamber communicating therebetween. In retrofit applications, the method may comprise removal of an existing air filter prior to installing the fire barrier air filter. The method may also comprise attachment of mounting brackets to the kitchen hood if suitable mounting brackets are not provided by the existing installation. For example, in a retrofit to an existing water-wash installation attachment of mounting brackets or tracks is an expected method step.

The method can further comprise inspection of the fire barrier air filter at predetermined time intervals and/or cleaning of the fire barrier air filter at predetermined time intervals. Inspection and cleaning schedules can be determined algorithmically based on an analysis of parameters of kitchen activity and use, and computer automated reminders or alerts can be set accordingly.

The method can include a step of testing the fire barrier air filter during or after installation to ensure a sufficiently vertical orientation to allow condensed liquids to roll down by gravitational pull. The method can also comprise a step of mounting a collection tray to receive condensed liquids from the fire barrier air filter and an additional step of connecting a reservoir to a drain outlet of the collection tray. After installation of the fire barrier air filter operation of the system will draw air flow in a transverse direction to the fire barrier air filter and air flow is expected to exhibit a temperature drop after passing through the fire barrier air filter. Flame tests have shown that the fire barrier air filter blocks passage of a flame, and the fire barrier air filter can extinguish a spark or a burning ember.

One or more components of the kitchen ventilation system may be packaged and distributed as a kitchen fire prevention kit. The kitchen fire prevention kit includes a fire barrier air filter comprising a plurality of pairs of facing elongate concave surfaces defining a narrow longitudinal inlet gap, a narrow longitudinal outlet gap, and a longitudinal tubular chamber communicating therebetween, and instructions for installing the fire barrier air filter in a kitchen hood communicative with a kitchen exhaust duct.

The instructions of the kit may further specify charts or table to determine inspection and cleaning schedules. The instructions of the kit may also specify use of the kit in the context of a suitable primary fire suppression system as may be set by fire prevention regulatory standards relevant to a desired implementation, for example, a use of the kit in combination with a $CO_2$ fire suppression system set to deploy compliant with an applicable regulatory standard. The kit may also include instructions for removal of an existing air filter prior to installing the fire barrier air filter. The kit may also include mounting brackets or tracks and instruction for their attachment to a kitchen hood, for example a kitchen hood of an existing water-wash installation. The kit may also include a collection tray and instructions for mounting the collection tray in alignment with a bottom surface of the fire barrier air filter to receive condensates from the fire barrier air filter. The kit may also include a container or reservoir and instructions for connecting the reservoir to a drain outlet of the collection tray.

Components of the system or the kit, such as the fire barrier air filter, the kitchen hood, the collection tray and the reservoir may be any desired shape or size to suit a desired implementation.

While extrusion is the preferred method of constructing the extrusion bodies, any other manufacturing technique that can sufficiently approximate the profile of the extrusion body may be accommodated by the system or the kit.

In other uses the system or the kit may be combined with agglomeration and HEPA filters as a 4 stage recirculation solution. This application recirculates more than 90% of all the air exhausted from the hood to reduce heavy reliance on the introduction of fresh outdoor make-up air. As air is being drawn out of the room by the exhaust system the equivalent amount of air needs to be drawn in to maintain the indoor outdoor pressure balance at normal levels so combustion, exhausting etc. is maintained as normal. Additionally injecting the recycled hot air at point of use increases the suction uplift as hot air rises and could also provide energy saving to the exhaust hood motor operation.

Embodiments described herein are intended for illustrative purposes without any intended loss of generality. Still further variants, modifications and combinations thereof are contemplated and will be recognized by the person of skill in the art. Accordingly, the foregoing detailed description is not intended to limit scope, applicability, or configuration of claimed subject matter.

What is claimed is:
1. A kitchen ventilation system, comprising:
 a kitchen hood communicative with a kitchen exhaust duct;
 a fan communicative with the hood to create an air flow through the hood and to the exhaust duct;
 one or more fire barrier air filters mounted to the hood to receive and filter the air flow in a position defining a majority surface area of a wall of said hood, each fire barrier air filter comprising a plurality of elongate extrusion bodies in parallel alignment;
each extrusion body bound by first and second opposing concave surfaces and first and second baffle surfaces, the first and second baffle surfaces oriented transverse to the air flow; and
at least one of the first and second concave surfaces oriented in facing-together opposition with a neighboring concave surface provided by a neighboring extrusion body to form a cooperating pair of facing-together concave surfaces, the pair of facing-together concave surfaces defining a narrow longitudinal inlet gap, a narrow longitudinal outlet gap, and a longitudinal tubular chamber communicating therebetween;
wherein the plurality of fire barrier air filters communicate with a common collection tray that is downwardly sloped toward an end thereof, from which said collection tray drains reservoir, via a heat resistant hose extending downward from said collection tray, into a reservoir that is supported locally on said hood.

2. The kitchen ventilation system of claim 1, wherein the first and second opposing concave surfaces are in mirrored symmetry.

3. The kitchen ventilation system of claim 1, wherein the longitudinal tubular chamber has a lateral cross-section of circular shape.

4. The kitchen ventilation system of claim 3, wherein a diameter of the longitudinal tubular chamber is 4 to 6 times greater than a width of the longitudinal inlet gap or outlet gap.

5. The kitchen ventilation system of claim 1, wherein the neighboring extrusion body is aligned in lateral offset so that the cooperating pair of facing-together concave surfaces are laterally offset from each other.

6. The kitchen ventilation system of claim 5, wherein the lateral offset is less than half the width of the concave surfaces.

7. The kitchen ventilation system of claim 6, wherein the neighboring extrusion body is rotated by 180 degrees.

8. The kitchen ventilation system of claim 1, wherein a longitudinal edge of one of the cooperating pair of facing-together concave surfaces overlaps with a longitudinal edge of the other of the cooperating pair of facing-together concave surfaces.

9. The kitchen ventilation system of claim 8, wherein a bulged projection extends from at least one longitudinal edge of each of the pair of facing-together concave surfaces.

10. The kitchen ventilation system of claim 9, wherein the bulged projection is uniform and coextensive with the longitudinal edge.

11. The kitchen ventilation system of claim 10, wherein the bulged projection has a lateral cross-section of circular shape.

12. The kitchen ventilation system of claim 1, wherein the fire barrier air filter is mounted in a sufficiently vertical orientation to allow condensed liquids to roll down by gravitational pull.

13. The kitchen ventilation system of claim 1, wherein a plurality of fire barrier air filters are mounted in parallel alignment.

14. The kitchen ventilation system of claim 1, wherein the heat resistant hose drains connects to said reservoir at an opening in a top surface of said reservoir, which is otherwise enclosed.

15. The kitchen ventilation system of claim 1, wherein the plurality of elongate extrusion bodies are made of aluminum.

16. The kitchen ventilation system of claim 1, wherein the plurality of elongate extrusion bodies are made of anodized aluminum.

17. The kitchen ventilation system of claim 1, wherein said fire barrier air filter comprises a frame delimiting an area of said fire barrier, and the plurality of elongate extrusion bodies span fully across said area from one side of the frame to an opposing side thereof.

18. A kitchen ventilation system comprising:
a kitchen hood communicative with a kitchen exhaust duct;
a fan communicative with the hood to create an air flow through the hood and to the exhaust duct;
one or more fire barrier air filters mounted to the hood to receive and filter the air flow in a position defining a majority surface area of a wall of said hood, each fire barrier air filter comprising:
  a plurality of elongate extrusion bodies in parallel alignment;
  each extrusion body bound by first and second opposing concave surfaces and first and second baffle surfaces, the first and second baffle surfaces oriented transverse to the air flow; and
  at least one of the first and second concave surfaces oriented in facing-together opposition with a neighboring concave surface provided by a neighboring extrusion body to form a cooperating pair of facing-together concave surfaces, the pair of facing together concave surfaces defining a narrow longitudinal inlet gap, a narrow longitudinal outlet gap, and a longitudinal tubular chamber communicating therebetween;
a collection tray forming an elongate channel spanning the one or more fire barrier air filters at bottom ends thereof to collecting liquid run-off therefrom, said collection tray having a downward slope toward an end thereof;
a drain tube attached to said collection tray adjacent said end thereof in a position extending from a bottom surface of said collection tray and fluidly communicating with an interior of said collection tray; and
a heat resistant hose having one end coupled to said drain tube, and another end connected to an opening in a top surface of a collection reservoir, which is otherwise enclosed, such that said liquid run-off flows along the downward slope of the collection tray toward and into the drain tube, and downwardly therefrom through the heat resistant hose and into the collection reservoir.

* * * * *